United States Patent
Liu (10) Patent No.: US 12,258,941 B2
(45) Date of Patent: Mar. 25, 2025

(54) WIND TURBINE PLANT AND POWER CONTROL METHOD AND DEVICE THEREOF

(71) Applicant: XINJIANG GOLDWIND SCIENCE & TECHNOLOGY CO., LTD., Xinjiang (CN)

(72) Inventor: Zhongpeng Liu, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 29 days.

(21) Appl. No.: 18/247,189

(22) PCT Filed: Dec. 11, 2020

(86) PCT No.: PCT/CN2020/135602
§ 371 (c)(1),
(2) Date: Mar. 29, 2023

(87) PCT Pub. No.: WO2022/068068
PCT Pub. Date: Apr. 7, 2022

(65) Prior Publication Data
US 2023/0366376 A1    Nov. 16, 2023

(30) Foreign Application Priority Data
Sep. 30, 2020   (CN) .......................... 202011058738.5

(51) Int. Cl.
F03D 7/02    (2006.01)

(52) U.S. Cl.
CPC .......... *F03D 7/0276* (2013.01); *F03D 7/0284* (2013.01); *F05B 2270/101* (2013.01); *F05B 2270/1032* (2013.01)

(58) Field of Classification Search
CPC ................. F03D 7/0276; F03D 7/0284; F05B 2270/101; F05B 2270/1032
See application file for complete search history.

(56) References Cited

U.S. PATENT DOCUMENTS

| 2007/0069522 A1 | 3/2007 | Barton et al. |
| 2008/0116690 A1 | 5/2008 | Kabatzke |

(Continued)

FOREIGN PATENT DOCUMENTS

| CN | 102900611 A | 1/2013 |
| CN | 103174587 A | 6/2013 |

(Continued)

OTHER PUBLICATIONS

G. Ramtharan, et al; "Frequency support from doubly fed induction generator wind turbines", IET Renew. Power Gener., 2007, 1, (1), pp. 3-9.
Yingjie Tan, et al; "A Suboptimal Power-Point-Tracking-Based Primary Frequency Response Strategy for DFIGs in Hybrid Remote Area Power Supply Systems", IEEE Transactions on Energy Conversion, vol. 31, No. 1, Mar. 2016; 13 pages.

(Continued)

*Primary Examiner* — Viet P Nguyen
(74) *Attorney, Agent, or Firm* — Frank Gao, Esq.

(57) ABSTRACT

A wind turbine plant and a power control method and device thereof are provided. The power control method comprises: controlling rotational speed and torque of a generator of the wind turbine plant based on an optimal rotational speed torque curve and a specific rotational speed torque curve, when receiving a power-limiting operation instruction or a power-releasing operation instruction; wherein, for each point on the optimal rotational speed torque curve, the specific rotational speed torque curve includes a point on an isopower curve starting from said point that satisfies a predetermined condition.

16 Claims, 4 Drawing Sheets

(56) References Cited

U.S. PATENT DOCUMENTS

| | | |
|---|---|---|
| 2012/0027587 A1 | 2/2012 | Lee et al. |
| 2013/0099495 A1 | 4/2013 | Gong |
| 2015/0159625 A1 | 6/2015 | Hardwicke, Jr. et al. |
| 2019/0195189 A1 | 6/2019 | Echenique Subiabre |
| 2019/0368465 A1 | 12/2019 | Mandrioli et al. |

FOREIGN PATENT DOCUMENTS

| | | |
|---|---|---|
| CN | 103187912 A | 7/2013 |
| CN | 104074679 A | 10/2014 |
| CN | 104153941 A | 11/2014 |
| CN | 105041567 A | 11/2015 |
| CN | 105909469 A | 8/2016 |
| CN | 105909470 A | 8/2016 |
| CN | 105927469 A | 9/2016 |
| CN | 106762408 A | 5/2017 |
| CN | 108521142 A | 9/2018 |
| CN | 109973302 A | 7/2019 |
| CN | 110529336 A | 12/2019 |
| CN | 111262256 A | 6/2020 |
| CN | 112392656 A | 2/2021 |
| KR | 101676968 B1 | 11/2016 |

OTHER PUBLICATIONS

The Extended European Seach Report dated Feb. 6, 2024; Appln. No. 20956085.3.

Wu Changming, et al; "Analysis of Control Methods for Wind Turbine Operation with High Wind Power and Lower Limit Power", Industrial Control Computer; vol. 29, Issue 5, 2016; 4 pages.

Lou Yaolin, et al; "Optimal Generator Study Based on Torque Follow-up Control for Wind Turbine", Transactions of China Electrotechnical Society, vol. 33, No. 8, Apr. 2018; 10 pages.

Zhichao Zhou, et al; "Output Power Curtailment Control of Variable-speed Variable-pitch Wind Turbine Generator at All Wind Speed Regions", Proceedings of the CSEE; vol. 35, No. 8, Apr. 20, 2015; 8 pages.

The First Chinese Office Action dated Apr. 26, 2024; Appln. No. 202011058738.5.

The International Search Report mailed Jun. 24, 2021; PCT/CN2020/135602.

Chinese Notice of Allowance dated Jul. 9, 2024; Appln. No. 202011058738.5.

Dong Li, et al.; "Analysis on the Primary Frequency Modulation Characteristics of the Permanent Magnet Direct Drive Wind Turbine Generator", Qinghai Electric Power, vol. 35, No. 1, Mar. 2016; 7 pages.

WIND TURBINE PLANT AND POWER CONTROL METHOD AND DEVICE THEREOF

This application is the National Stage of International Application No. PCT/CN2020/135602, filed Dec. 11, 2020,, which claims priority to Chinese Patent Application No. 202011058738.5, filed Sep. 30, 2020, both of which are hereby incorporated by reference in their entirety.

FIELD OF THE INVENTION

The present disclosure generally relates to the technical field of wind power, and more specifically, relates to a wind turbine plant and a power control method and device thereof.

BACKGROUND OF THE INVENTION

Main logic of a primary frequency adjustment strategy for a wind turbine plant is based on how the plant limits/releases its power. When the power limiting for the wind turbine plant is in a speed shifting stage, the set rotational speed and the set torque of the plant will be changed simultaneously if the motions of power limiting/releasing continues. Especially for large impeller plants, when a primary frequency adjustment power increasing instruction is received by the plant after the power limiting for the wind turbine is in the speed shifting stage, due to the large inertia of the impeller, if the ambient wind speed is low, the speed rise will be slower, thus affecting the response time of the primary frequency adjustment.

SUMMARY OF THE INVENTION

Exemplary embodiments of the present disclosure provide a power control method for a wind turbine plant, which can effectively control rotational speed and torque of a generator in response to a power-limiting operation instruction or a power-releasing operation instruction.

According to an exemplary embodiment of the present disclosure, a power control method for a wind turbine plant is provided. The power control method comprises: controlling rotational speed and torque of a generator of the wind turbine plant based on an optimal rotational speed torque curve and a specific rotational speed torque curve, when receiving a power-limiting operation instruction or a power-releasing operation instruction; wherein, for each point on the optimal rotational speed torque curve, the specific rotational speed torque curve includes a point on an isopower curve starting from said point that satisfies a predetermined condition, and wherein the predetermined condition is that a corresponding power value of said point on the isopower curve is lower than a power value corresponding to a point on the optimal rotational speed torque curve at the same rotational speed value as said point on the isopower curve by a predetermined value.

According to another exemplary embodiment of the present disclosure, a power control device for a wind turbine plant, wherein the power control device comprises: a control unit for controlling rotational speed and torque of a generator of the wind turbine plant based on an optimal rotational speed torque curve and a specific rotational speed torque curve, when receiving a power-limiting operation instruction or a power-releasing operation instruction; wherein, for each point on the optimal rotational speed torque curve, the specific rotational speed torque curve includes a point on an isopower curve starting from said point that satisfies a predetermined condition, and wherein the predetermined condition is that a corresponding power value of said point on the isopower curve is lower than a power value corresponding to a point on the optimal rotational speed torque curve at the same rotational speed value as said point on the isopower curve by a predetermined value.

According to another exemplary embodiment of the present disclosure, a computer-readable storage medium storing a computer program is provided, wherein the computer program, when executed by the processor, implements the power control method for the wind turbine plant described above.

According to another exemplary embodiment of the present disclosure, a power control device for a wind turbine plant is provided, wherein the power control device comprises: a processor; a memory, storing a computer program, wherein the computer program, when executed by the processor, implements the power control method for the wind turbine plant described above.

According to yet another exemplary embodiment of the present disclosure, a wind turbine plant is provided, and the wind turbine plant is provided with the power control device described above.

According to the power control method and device for the wind turbine plant in the exemplary embodiments of the present disclosure, it can effectively control the rotational speed and torque of the generator in response to the power-limiting operation instruction or the power-releasing operation instruction. In addition, in the present disclosure, by effectively setting rotational speed target value and torque target value when limiting or releasing power, a certain space for frequency adjustment is reserved, so that the plant may directly complete the primary frequency adjustment by raising or lowering the torque without changing the speed. Thus it can quickly respond to the primary frequency adjustment instruction, and has a positive effect on the load of the plant due to the small rotational speed change.

Additional aspects and/or advantages of the general inventive concept of the present disclosure will be partially set forth in the following description, and some of them will be clear from the description, or can be learned through implementation of the general inventive concept of the present disclosure.

BRIEF DESCRIPTION OF THE DRAWINGS

The above other objects and features of exemplary embodiments of the present disclosure will become more apparent through the following descriptions in conjunction with the accompanying drawings exemplarily showing the embodiments, in which.

DETAILED DESCRIPTION

Reference will now be made in detail to embodiments of the present disclosure, examples of which are illustrated in the accompanying drawings, wherein like numerals refer to like elements throughout. The embodiments are described below in order to explain the present disclosure by referring to the figures.

Figure 1:
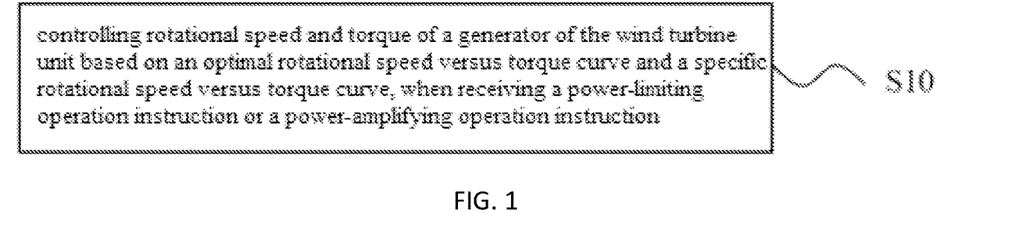
FIG. 1 shows a flowchart of a power control method for a wind turbine plant according to an exemplary embodiment of the present disclosure.

FIG. 1 shows a flowchart of a power control method of a wind turbine plant according to an exemplary embodiment of the present disclosure.

Referring to FIG. 1, in step S10, rotational speed and torque of a generator of the wind turbine plant is controlled based on an optimal rotational speed torque curve and a specific rotational speed torque curve, when a power-limiting operation instruction or a power-releasing operation instruction is received.

As an example, the optimal rotational speed torque curve is a characteristic curve of the generator, which indicates optimal rotational speed and optimal torque of the generator under different powers. When the wind turbine plant is operating in normal operation rather than power limiting operation, it is operating on an optimal rotational speed torque curve.

The specific rotational speed torque curve is constructed based on the optimal rotational speed torque curve, specifically, for each point on the optimal rotational speed torque curve, the specific rotational speed torque curve includes a point on an isopower curve starting from said point that satisfies a predetermined condition, and a corresponding power value of said point on the isopower curve is lower than a power value corresponding to a point on the optimal rotational speed torque curve at the same rotational speed value as said point on the isopower curve by a predetermined value.

Figure 2:
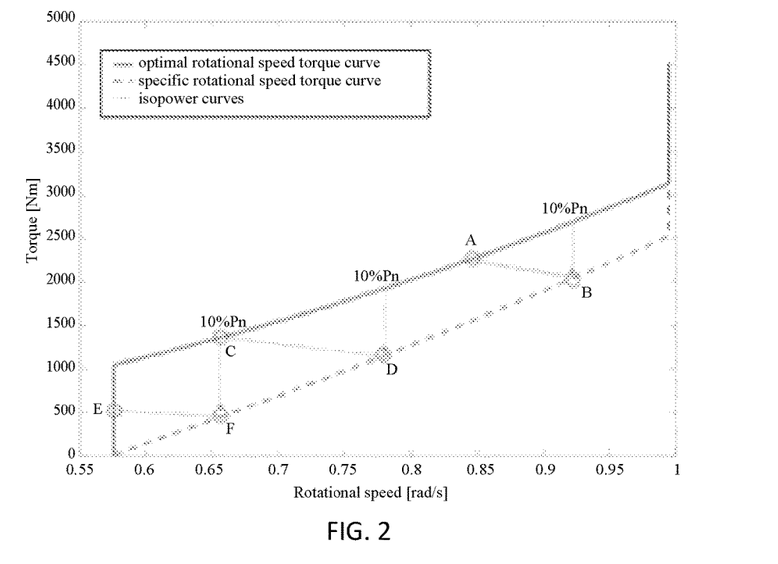
FIG. 2 shows an example of a specific rotational speed torque curve according to an exemplary embodiment of the present disclosure.

For example, the relationship between the optimal rotational speed torque curve and the specific rotational speed torque curve can be shown in FIG. 2. As an example only, the predetermined value is a predetermined ratio of rated power (for example, 10% of rated power Pn), wherein a point A on the optimal rotational speed torque curve has the same power as a point B on the specific rotational speed torque curve, and a power value corresponding to the point B (that is, the power value when rotational speed and torque are the rotational speed and torque values of the point B) has a rated power 10% lower than a power value corresponding to a point on the optimal rotational speed torque curve where the rotational speed value is equal to the point B. Accordingly, a point C on the optimal rotational speed torque curve has the same power as a point D on the specific rotational speed torque curve, and a power value corresponding to point D has a rated power 10% lower than a power value corresponding to the point on the optimal rotational speed torque curve where the rotational speed value is equal to the point D; a point E on the optimal rotational speed torque curve has the same power as a point F on the specific rotational speed torque curve, and a power value corresponding to point F has a rated power 10% lower than a power value corresponding to the point on the optimal rotational speed torque curve where the rotational speed value is equal to the point F.

As an example, the power-limiting operation instruction or power-releasing operation instruction may be a secondary frequency adjustment instruction, for example, the requirements for response time and stabilization time of the secondary frequency adjustment are much slower than those of the primary frequency adjustment.

It should be understood that the power control method for the wind turbine plant according to the exemplary embodiment of the present disclosure is not only applicable to a power limiting action where the power is less than or equal to the rated power and the lowest limitable power is 0; but also applicable to a power-releasing action where the power is greater than or equal to 0 and the maximum released power may reach the rated power.

Figure 3:
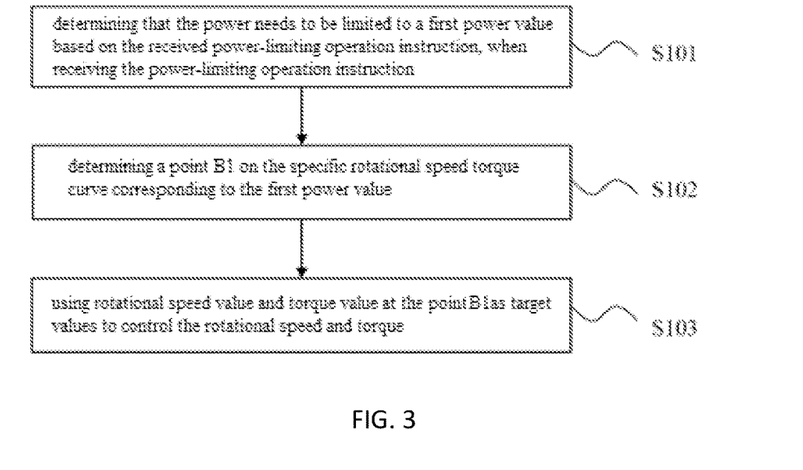
FIG. 3 shows a flowchart of a method for limiting power according to an exemplary embodiment of the present disclosure.

FIG. 3 shows a flowchart of a method for limiting power according to an exemplary embodiment of the present disclosure. When step S10 is executed, the method is performed in the following step: controlling rotational speed and torque of a generator of the wind turbine plant based on an optimal rotational speed torque curve and a specific rotational speed torque curve, when receiving a power-limiting operation instruction.

In step S101, determining that the power needs to be limited to a first power value based on the received power-limiting operation instruction, when receiving the power-limiting operation instruction.

In step S102, determining a point B1 on the specific rotational speed torque curve corresponding to the first power value.

A point A1 is a point on the optimal rotational speed torque curve corresponding to the point B1 along an isopower curve, that is, power values corresponding to the point A1 and the point B1 are both the first power value.

In step S103, using a rotational speed value and a torque value at the point B1 as target values (i.e., set values) to control the rotational speed and torque.

Figure 4:
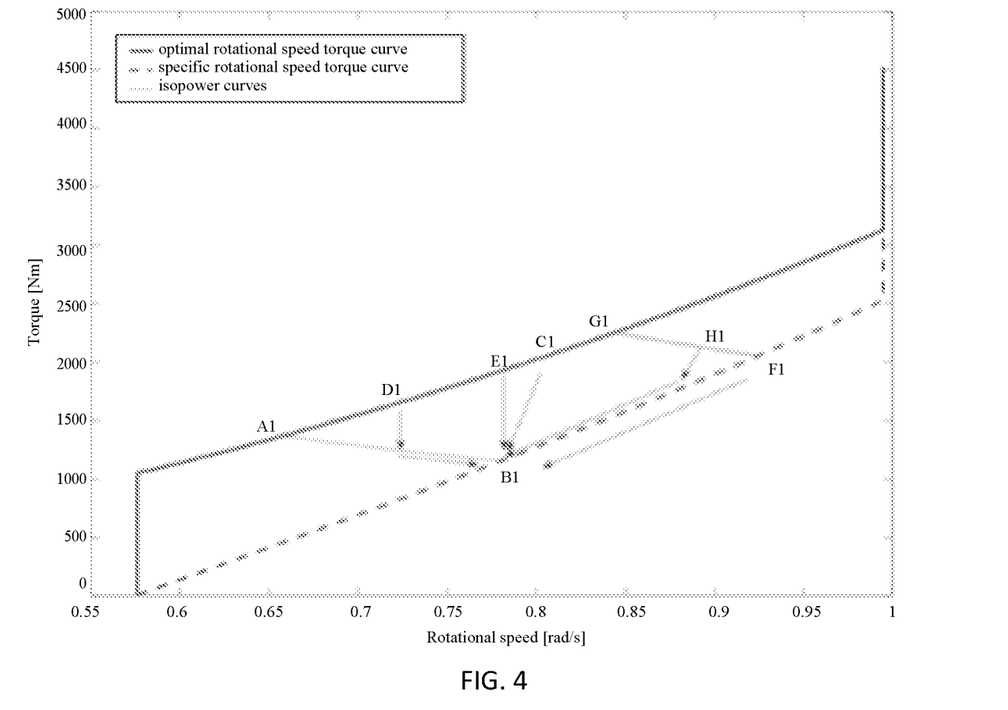
FIG. 4 shows an example of a method for controlling rotational speed and torque in response to a power-limiting operation instruction according to an exemplary embodiment of the present disclosure.

Referring to FIG. 4, in one embodiment, when it is currently in a normal operating state, the step S103 may include:

Controlling the rotational speed and torque to drop simultaneously to directly reach the point B1, or controlling the rotational speed and torque to drop simultaneously to the specific rotational speed torque curve and then change to the point B1 (i.e., change to the rotational speed and torque of the point B1) along the specific rotational speed torque curve, or controlling the rotational speed to drop to the speed value of the point B1 and then controlling the torque to drop to the torque value of point B1 (i.e., first drop the rotational speed, then the torque), when the current rotational speed value is greater than the rotational speed value at the point B1 (for example, a point C1 currently operating at the optimal rotational speed torque curve);

Controlling the torque to drop to the isopower curve between the point B1 and the point A1, and then controlling the rotational speed and torque to change to the point B1 along the isopower curve (i.e., first controlling the torque to drop, then controlling both the rotational speed and torque), when the current rotational speed value is less than the rotational speed value at the point B1 (for example, a point D1 currently operating at the optimal rotational speed torque curve);

Controlling the torque to drop to the torque value of the point B1, when the current rotational speed value is equal to the rotational speed value at the point B1 (for example, a point E1 currently operating at the optimal rotational speed torque curve).

Referring to FIG. 4, in another embodiment, when it is currently in a power-limiting operating state or power-releasing operating state, the step S103 may include:

Controlling the rotational speed and torque to change from a point F1 to the point B1 along the specific rotational speed torque curve, when it is currently operating at any point F1 on the specific rotational speed torque curve (i.e., the current rotational speed and torque are the rotational speed and torque values of the point F1); for example, the point F1 may be the current power limiting point;

Controlling the rotational speed and torque to drop simultaneously to the specific rotational speed torque curve from H1 and then change to the point B1 along the specific rotational speed torque curve, when it is currently operating on the isopower curve between the point F1 and the point G1 on the optimal rotational speed torque curve (for example, a point H1 currently operating on the isopower curve);

Controlling the rotational speed and torque to drop simultaneously to directly reach the point B1, or controlling the rotational speed and torque to drop simultaneously to the specific rotational speed torque curve and then change to the point B1 along the specific rotational speed torque curve, or controlling the rotational speed to drop to the speed value of the point B1 and then controlling the torque to drop to the torque value of point B1, when the wind turbine plant is currently operating at a point on the optimal rotational speed torque curve with a rotational speed value greater than the rotational speed value at the point C1 of B1;

Controlling the torque to drop to the isopower curve between the point B1 and the point A1, and then controlling the rotational speed and torque to change to the point B1 along the isopower curve, when the wind turbine plant is currently operating at a point on the optimal rotational speed torque curve with a rotational speed value less than the rotational speed value at the point D1 of B1;

Controlling the torque to drop to the torque value of the point B1, when the wind turbine plant is currently operating at a point on the optimal rotational speed torque curve with a rotational speed value equal to the rotational speed value at the point E1 of B1.

It should be understood that the solid line with arrows in FIG. 4 indicates the actual variation trajectory (trend) of the rotational speed and torque.

Figure 5:
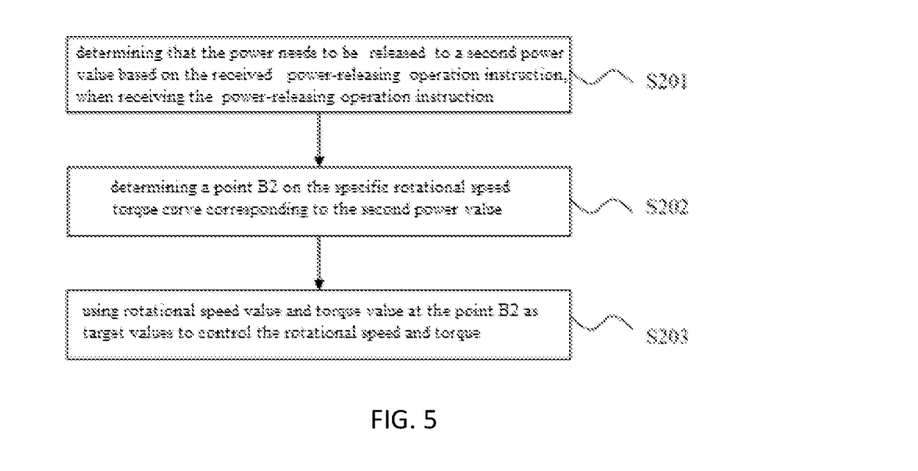
FIG. 5 shows a flowchart of a method for releasing power according to an exemplary embodiment of the present disclosure.

FIG. 5 shows a flowchart of a method for releasing power according to an exemplary embodiment of the present disclosure. It should be understood that, when step S10 is executed, the method may be performed in the following step: controlling rotational speed and torque of a generator of the wind turbine plant based on an optimal rotational speed torque curve and a specific rotational speed torque curve, when receiving a power-releasing operation instruction.

In step S201, determining that the power needs to be released to a second power value based on the received power-releasing operation instruction, when receiving the power-releasing operation instruction.

In step S202, determining a point B2 on the specific rotational speed torque curve corresponding to the second power value.

A point A2 is a point on the optimal rotational speed torque curve corresponding to the point B2 along an isopower curve, that is, power values corresponding to the point A2 and the point B2 are both the first power value.

In step S203, using a rotational speed value and a torque value at the point B2 as target values to control the rotational speed and torque.

Figure 6:
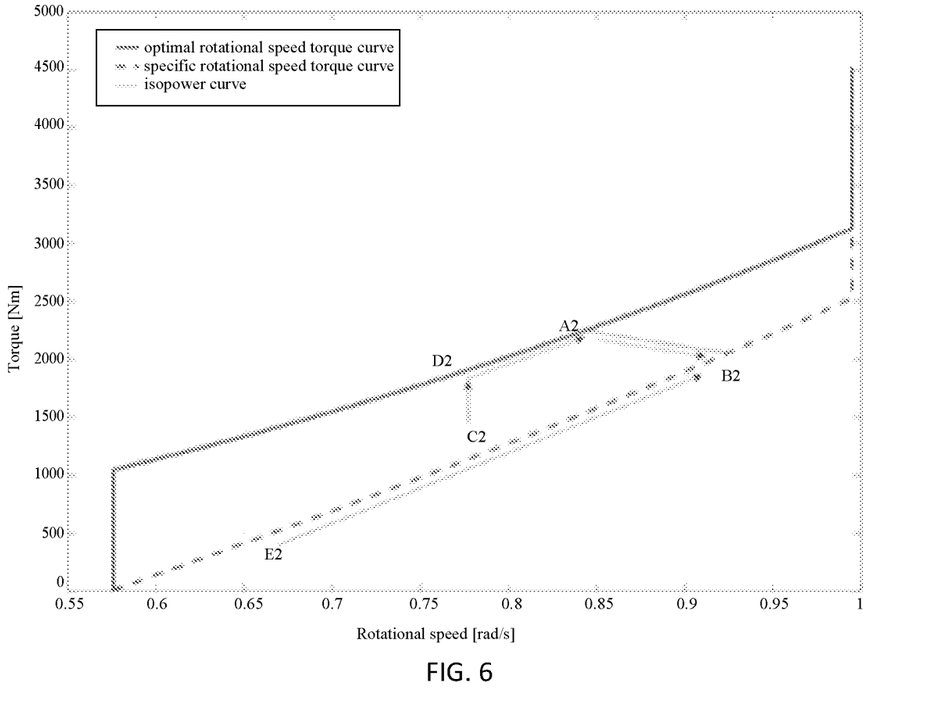
FIG. 6 shows an example of a method for controlling rotational speed and torque in response to a power-releasing operation instruction according to an exemplary embodiment of the present disclosure.

Referring to FIG. 6, in one embodiment, when it is currently in a normal operating state, the step S203 may include:

Controlling the rotational speed and torque to change to the point B2, when there is energy reserve during the entire power releasing process;

Controlling the rotational speed and torque (that is, the actual value of the rotational speed and the torque) to stay at a point C2, and controlling a target torque value to increase from the point C2 to D2 on the optimal rotational speed torque curve (during this process, the target rotational speed value remains unchanged) and then controlling the target torque value and target rotational speed value to increase from a point D2 to a point A2 along the optimal rotational speed torque curve, and controlling the target torque value and target rotational speed value from the point A2 to the point B2 along the isopower curve, when there is no reserve energy after controlling the rotational speed and torque to any point C2 on the specific rotational speed torque curve during the power releasing.

Referring to FIG. 6, in another embodiment, when it is currently in the power-limiting operating state or power-releasing operating state, the step S203 may include:

Controlling the rotational speed and torque (for example, currently operating at power-limiting point E2) to change to the point B2 along the specific rotational speed torque curve, when there is energy reserve during the entire power releasing process;

Controlling the rotational speed and torque to stay at a point C2, and controlling a target torque value to increase from the point C2 to the optimal rotational speed torque curve and then controlling the target torque value and target rotational speed value to increase to a point A2 along the optimal rotational speed torque curve, and controlling the target torque value and target rotational speed value from the point A2 to the point B2 along the isopower curve, when there is no reserve energy after controlling the rotational speed and torque (for example, from operating at the power-limiting point E2 along the specific rotational speed torque curve) to any point C2 on the specific rotational speed torque curve during the power releasing.

Figure 7:
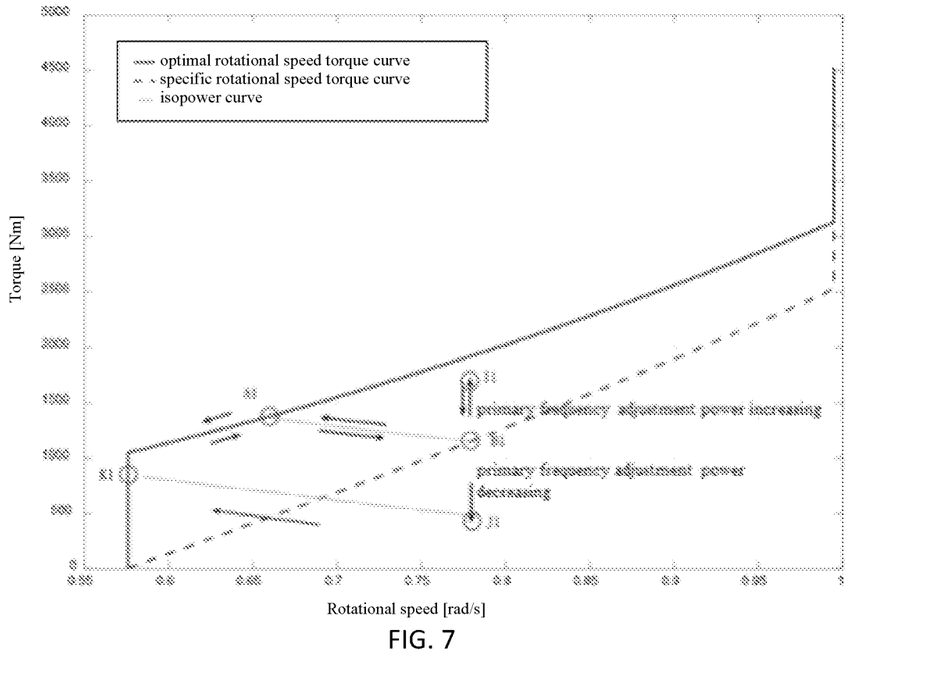
FIG. 7 shows an example of a method for controlling rotational speed and torque after power limitation according to an exemplary embodiment of the present disclosure.

Referring to FIG. 7, in one embodiment, after the step of controlling the rotational speed and torque of the generator of the wind turbine plant based on the optimal rotational speed torque curve and the specific rotational speed torque curve when receiving the power-limiting operation instruction, when it is operating at the power-limiting point B1 (for example, the wind speed is relatively high and there is energy reserve) and no primary frequency adjustment instruction is received, if the wind speed first drops and then rises, then as the wind speed decreases, controlling the rotational speed and torque to change from the point B1 to the point A1 along the isopower curve and then decrease along the optimal rotational speed torque curve, and then as the wind speed increases, controlling the rotational speed and torque to increase to the point A1 along the optimal rotational speed torque curve and then change to the point B1 along the isopower curve.

In addition, as an example, after the step of controlling the rotational speed and torque of the generator of the wind turbine plant based on the optimal rotational speed torque curve and the specific rotational speed torque curve when receiving the power-limiting operation instruction, when the current operation cannot be maintained at the limiting power point B1 (for example, the wind speed is low and there is no reserve energy) and no primary frequency adjustment instruction is received, if the wind speed first drops and then rises, then as the wind speed decreases, controlling the rotational speed and torque to change to the optimal rotational speed torque curve along the isopower curve and then decrease along the optimal rotational speed torque curve, and then as the wind speed increases, controlling the rotational speed and torque to increase along the optimal rotational speed torque curve and then change to the specific rotational speed torque curve along the isopower curve.

In addition, as an example, when it is currently operating at an power releasing point or is currently in a power releasing operating state but cannot be maintained at the power releasing point, if no primary frequency adjustment instruction is received and the wind speed first drops and then rises, the rotational speed and torque may also be controlled with reference to the operation described above in conjunction with FIG. 7.

Referring to FIG. 7, in another embodiment, after the step of controlling the rotational speed and torque of the generator of the wind turbine plant based on the optimal rotational speed torque curve and the specific rotational speed torque curve when receiving the power-limiting operation instruction, when it is operating at the point B1 and a primary frequency adjustment power increasing instruction is received, determining that the power needs to be increased to a third power value based on the received frequency adjustment power increasing instruction, and controlling the rotational speed to remain unchanged and controlling the torque to increase until the power increases to the third power value. That is, the rotational speed and torque is controlled from point B1 to point I1. Further, as an example, after controlling the rotational speed and torque to change from point B1 to point I1, if the wind speed first decreases and then increases, then as the wind speed decreases, controlling the rotational speed to remain unchanged and controlling the torque to decrease until returning to point B1 (that is, changing from point I1 to point B1), and then control the speed and torque to change from point B1 along the isopower curve to point A1 and then drop along the optimal rotational speed torque curve, and then as the wind speed rises, controlling the rotational speed and torque to rise to point A1 along the optimal rotational speed torque curve, and then change to point B1 along the isopower curve.

Referring to FIG. 7, in another embodiment, after the step of controlling the rotational speed and torque of the generator of the wind turbine plant based on the optimal rotational speed torque curve and the specific rotational speed torque curve when receiving the power-limiting operation instruction, when it is operating at the point B1 and a primary frequency adjustment power decreasing instruction is received, determining that the power needs to be decreased to a fourth power value based on the received primary frequency adjustment power decreasing instruction, and controlling the rotational speed to remain unchanged and controlling the torque to decrease until the power decreases to the fourth power value. That is, the rotational speed and torque is controlled from point B1 to point J1. Further, as an example, after controlling the rotational speed and torque to change from point B1 to point J1, if the wind speed first decreases and then increases, then as the wind speed decreases, controlling the rotational speed and torque to change to the optimal rotational speed torque curve along the isopower curve (that is, controlling the rotational speed and torque change from point J1 to point K1 along the isopower curve) and then drop along the optimal rotational speed torque curve, and then as the wind speed rises, controlling the rotational speed and torque to rise to point A1 along the optimal rotational speed torque curve, and then change to point B1 along the isopower curve.

In addition, as an example, when it is currently operating at a power releasing point, if the primary frequency adjustment instruction is received, the rotational speed and torque may also be controlled with reference to the operation described above in conjunction with FIG. 7.

In another embodiment, after the step of controlling the rotational speed and torque of the generator of the wind turbine plant based on the optimal rotational speed torque curve and the specific rotational speed torque curve when receiving the power-limiting operation instruction, when it is in a power-limiting operating state and cannot maintain the operation at the point B1 (for example, the wind speed is low and there is no reserve energy), and the primary frequency adjustment power decreasing instruction is received, determining that the power needs to be decreased to a fifth power value based on an adjustment amount in the received primary frequency adjustment power decreasing instruction and the current power (in other words, the current target power value of the plant jumps to the current actual power value to ensure that the plant will not jump), and controlling the rotational speed to remain unchanged and controlling the torque to decrease until the power decreases to the fifth power value. Further, as an example, after controlling the rotational speed unchanged and torque to decrease until the power decreases to the fifth power value, as the wind speed decreases, controlling the rotational speed and torque to change to the optimal rotational speed torque curve along the isopower curve and then drop along the optimal rotational speed torque curve, and then as the wind speed rises, controlling the rotational speed and torque to rise to point A1 along the optimal rotational speed torque curve, and then change to point B1 along the isopower curve. In addition, as an example, when it is currently in the power-releasing operating state but cannot maintain the operation at the power-releasing point, and when the primary frequency adjustment instruction is received, the speed and torque may also be controlled by referring to the above-mentioned operation.

Figure 8:
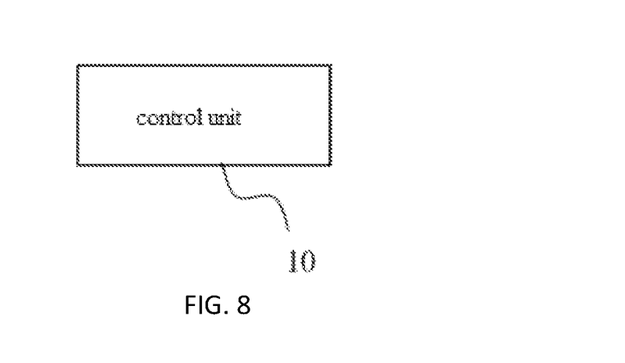
FIG. 8 shows a structural block diagram of a power control device of a wind turbine plant according to an exemplary embodiment of the present disclosure.

FIG. 8 shows a structural block diagram of a power control device of a wind turbine according to an exemplary embodiment of the present disclosure.

As shown in FIG. 8, the power control device of the wind turbine plant according to an exemplary embodiment of the present disclosure includes: a control unit 10.

Specifically, the control unit 10 is used for controlling the rotational speed and torque of the generator of the wind turbine plant based on an optimal rotational speed torque curve and a specific rotational speed torque curve, when receiving a power-limiting operation instruction or a power-releasing operation instruction. Wherein, for each point on the optimal rotational speed torque curve, the specific rotational speed torque curve includes a point on an isopower curve starting from said point that satisfies a predetermined condition, and wherein the predetermined condition is that a corresponding power value of said point is lower than the power value corresponding to the point on the optimal rotational speed torque curve at the same rotational speed value by a predetermined value.

Figure 9:
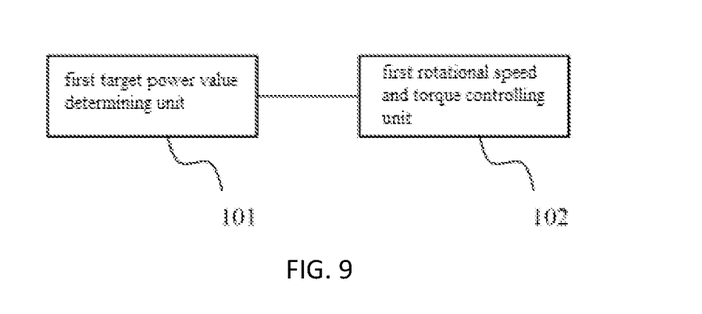
FIG. 9 shows a structural block diagram of a control unit according to an exemplary embodiment of the present disclosure.

FIG. 9 shows a structural block diagram of a control unit according to an exemplary embodiment of the present disclosure.

As shown in FIG. 9, the control unit 10 may include a first target power value determining unit 101 and a first rotational speed and torque controlling unit 102.

Specifically, the first target power value determining unit 101 is configured for determining that the power needs to be limited to a first power value based on the received power-limiting operation instruction, when receiving the power-limiting operation instruction.

The first rotational speed and torque controlling unit 102 is configured for determining a point B1 on the specific rotational speed torque curve corresponding to the first power value, and using a rotational speed value and a torque value at the point B1 as target values to control the rotational speed and torque.

As an example, when it is currently in a normal operating state, the first rotational speed and torque controlling unit 102 may perform the following operations to control the rotational speed and torque with the rotational speed and torque values at point B1 as target values:

Controlling the rotational speed and torque to drop simultaneously to directly reach the point B1, or controlling the rotational speed and torque to drop simultaneously to the specific rotational speed torque curve and then change to the point B1 (i.e., change to the rotational speed and torque of the point B1) along the specific rotational speed torque curve, or controlling the rotational speed to drop to the speed value of the point B1 and then controlling the torque to drop to the torque value of point B1 (i.e., first drop the rotational speed, then the torque), when the current rotational speed value is greater than the rotational speed value at the point B1 (for example, a point C1 currently operating at the optimal rotational speed torque curve);

Controlling the torque to drop to the isopower curve between the point B1 and the point A1, and then controlling the rotational speed and torque to change to the point B1 along the isopower curve (i.e., first drop the torque, then both the rotational speed and torque), when the current rotational speed value is less than the rotational speed value at the point B1 (for example, a point D1 currently operating at the optimal rotational speed torque curve);

Controlling the torque to drop to the torque value of the point B1, when the current rotational speed value is equal to the rotational speed value at the point B1 (for example, a point E1 currently operating at the optimal rotational speed torque curve).

As another example, when it is currently in a power-limiting operating state or power-releasing operating state, the first rotational speed and torque controlling unit 102 may perform the following operations to control the rotational speed and torque with the rotational speed and torque values at point B1 as target values:

Controlling the rotational speed and torque to change from a point F1 to the point B1 along the specific rotational speed torque curve, when it is currently operating at any point F1 on the specific rotational speed torque curve (i.e., the current rotational speed and torque are the rotational speed and torque values of the point F1); for example, the point F1 may be the current power limiting point;

Controlling the rotational speed and torque to drop simultaneously to the specific rotational speed torque curve and then change to the point B1 along the specific rotational speed torque curve, when it is currently operating on the isopower curve between the point F1 and the point G1 on the optimal rotational speed torque curve (for example, a point H1 currently operating on the isopower curve);

Controlling the rotational speed and torque to drop simultaneously to directly reach the point B1, or controlling the rotational speed and torque to drop simultaneously to the specific rotational speed torque curve and then change to the point B1 along the specific rotational speed torque curve, or controlling the rotational speed to drop to the speed value of the point B1 and then controlling the torque to drop to the torque value of point B1, when the wind turbine plant is currently operating at a point on the optimal rotational speed torque curve with a rotational speed value greater than the rotational speed value at the point C1 of B1;

Controlling the torque to drop to the isopower curve between the point B1 and the point A1, and then controlling the rotational speed and torque to change to the point B1 along the isopower curve, when the wind turbine plant is currently operating at a point on the optimal rotational speed torque curve with a rotational speed value less than the rotational speed value at the point D1 of B1;

Controlling the torque to drop to the torque value of the point B1, when the wind turbine plant is currently operating at a point on the optimal rotational speed torque curve with a rotational speed value equal to the rotational speed value at the point E1 of B1.

Figure 10:
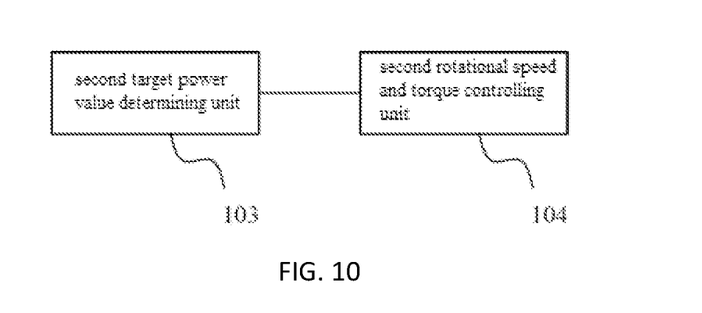
FIG. 10 shows a structural block diagram of a control unit according to another exemplary embodiment of the present disclosure.

FIG. 10 shows a structural block diagram of a control unit according to another exemplary embodiment of the present disclosure.

As shown in FIG. 10, the control unit 10 may include a second target power value determining unit 103 and a second rotational speed and torque controlling unit 104. Furthermore, as an example, the control unit 10 may include a first target power value determining unit 101, a first rotational speed and torque controlling unit 102, a second target power value determining unit 103 and a second rotational speed and torque controlling unit 104.

Specifically, the second target power value determining unit 103 is configured for determining that the power needs to be released to a second power value based on the received power-releasing operation instruction, when receiving the power-releasing operation instruction.

The second rotational speed and torque controlling unit 104 is configured for determining a point B2 on the specific rotational speed torque curve corresponding to the second power value, and using a rotational speed value and a torque value at the point B2 as target values to control the rotational speed and torque.

As an example, when it is currently in a normal operating state, the second rotational speed and torque controlling unit 104 may perform the following operations to control the rotational speed and torque with the rotational speed and torque values at point B2 as target values: controlling the rotational speed and torque to change to point B2, when there is energy reserve during the entire power releasing process.

Controlling the rotational speed and torque (that is, the actual value of the rotational speed and the torque) to stay at a point C2, and controlling a target torque value to increase from the point C2 to D2 on the optimal rotational speed torque curve (during this process, the target rotational speed value remains unchanged) and then controlling the target torque value and target rotational speed value to increase from a point D2 to a point A2 along the optimal rotational speed torque curve, and controlling the target torque value and target rotational speed value from the point A2 to the point B2 along the isopower curve, when there is no reserve energy after controlling the rotational speed and torque to any point C2 on the specific rotational speed torque curve during the power releasing.

As another example, when it is currently in a power-limiting operating state or power-releasing operating state, the second rotational speed and torque controlling unit 104 may perform the following operations to control the rotational speed and torque with the rotational speed and torque values at point B2 as target values:

Controlling the rotational speed and torque (for example, currently operating at power-limiting point E2) to change to the point B2 along the specific rotational speed torque curve, when there is energy reserve during the entire power releasing process;

Controlling the rotational speed and torque to stay at a point C2, and controlling a target torque value to increase from the point C2 to the optimal rotational speed torque curve and then controlling the target torque value and target rotational speed value to increase to a point A2 along the optimal rotational speed torque curve, and controlling the target torque value and target rotational speed value from the point A2 to the point B2 along the isopower curve, when there is no reserve energy after controlling the rotational speed and torque (for example, from operating at the power-limiting point E2 along the specific rotational speed torque curve) to any point C2 on the specific rotational speed torque curve during the power releasing.

As an example, after controlling, by the first rotational speed and torque controlling unit 102, the rotational speed and torque with the rotational speed and torque values at point B1 as target values, when it is operating at point B1 and no primary frequency adjustment instruction is received, as the wind speed decreases, the first rotational speed and torque controlling unit 102 may control the rotational speed and torque to change from the point B1 to the point A1 along the isopower curve and then decrease along the optimal rotational speed torque curve, and then as the wind speed increases, control the rotational speed and torque to increase to the point A1 along the optimal rotational speed torque curve and then change to the point B1 along the isopower curve.

As an example, after controlling, by the first rotational speed and torque controlling unit 102, the rotational speed and torque with the rotational speed and torque values at point B1 as target values, when it is operating at the point B1 and a primary frequency adjustment power increasing instruction is received, the second target power value determining unit 103 may determine that the power needs to be increased to a third power value based on the received frequency adjustment power increasing instruction, and the second rotational speed and torque controlling unit 104 may control the rotational speed to remain unchanged and control the torque to increase until the power increases to the third power value.

As an example, after controlling, by the first rotational speed and torque controlling unit 102, the rotational speed and torque with the rotational speed and torque values at point B1 as target values, when it is operating at the point B1 and a primary frequency adjustment power decreasing instruction is received, the first target power value determining unit 101 may determine that the power needs to be decreased to a fourth power value based on the received primary frequency adjustment power decreasing instruction, and the first rotational speed and torque controlling unit 102 may control the rotational speed to remain unchanged and control the torque to decrease until the power decreases to the fourth power value.

As an example, after controlling, by the second rotational speed and torque controlling unit 104, the rotational speed unchanged and torque to increase to the third power value, as the wind speed decreases, the second rotational speed and torque controlling unit 104 may control the rotational speed unchanged and the torque to change to the point B1, and control the rotational speed and torque to change from point B1 to point A1 along the isopower curve and then drop along the optimal rotational speed torque curve, and then as the wind speed rises, the second rotational speed and torque controlling unit 104 may control the rotational speed and torque to rise to point A1 along the optimal rotational speed torque curve, and then change to point B1 along the isopower curve.

As an example, after controlling, by the first rotational speed and torque controlling unit 102, the rotational speed unchanged and torque to decrease to the fourth power value, the first rotational speed and torque controlling unit 102 may, as the wind speed decreases, control the rotational speed and torque to change to the optimal rotational speed torque curve along the isopower curve and then drop along the optimal rotational speed torque curve, and then as the wind speed rises, the first rotational speed and torque controlling unit 102 may control the rotational speed and torque to rise to point A1 along the optimal rotational speed torque curve, and then change to point B1 along the isopower curve.

As an example, after controlling, by the first rotational speed and torque controlling unit 102, the rotational speed and torque with the rotational speed and torque values at point B1 as target values, when it is currently in a power limiting operating state but cannot maintain the operation at point B1, and a primary frequency adjustment power decreasing instruction is received, the first target power value determining unit 101 may determine that the power needs to be reduced to the fifth power value based on the adjustment amount in the received primary frequency adjustment power decreasing instruction and the current power; the first rotational speed and torque controlling unit 102 may control the rotational speed to remains unchanged and control the torque to decrease until the power is reduced to the fifth power value.

As an example, the power control device of the wind turbine plant according to the exemplary embodiment of the present disclosure may be set in a main controller of the wind turbine plant.

It should be understood that the specific processing performed by the power control device of the wind turbine plant according to the exemplary embodiments of the present disclosure has been described in detail with reference to FIG. 1 to FIG. 7, and relevant details will not be repeated here.

It should be understood that each unit in the power control device of a wind turbine plant according to the exemplary embodiments of the present disclosure may be implemented as a hardware component and/or a software component. Those skilled in the art may implement each unit, for example, by using a Field Programmable Gate Array (FPGA) or an Application Specific Integrated Circuit (ASIC) according to the defined processing performed by each unit.

Exemplary embodiments of the present disclosure provide a computer-readable storage medium storing a computer program, and when the computer program is executed by a processor, the power control method for the wind turbine plant as described in the above-mentioned exemplary embodiments is implemented. The computer readable storage medium is any data storage device that can store data that is read by a computer system. Examples of computer-readable storage media include: read-only memory, random-access memory, compact disc-read-only, magnetic tape, floppy disk, optical data storage devices, and carrier waves (such as data transmission over the Internet via wired or wireless transmission paths).

The power control device for the wind turbine plant according to the exemplary embodiments of the present disclosure includes: a processor (not shown) and a memory (not shown), wherein the memory stores a computer program, and when the computer program is executed by the processor, implementing the power control method of the wind turbine plant as described in the above exemplary embodiments.

While a few exemplary embodiments of the present disclosure have been shown and described, it should be understood by those skilled in the art that such modifications may be made without departing from the principles and spirit of the present disclosure, the scope of which is defined by the claims and their equivalents.

What is claimed is:

1. A power control method for a wind turbine plant, wherein the power control method comprises:
    controlling rotational speed and torque of a generator of the wind turbine plant based on an optimal rotational speed torque curve and a specific rotational speed torque curve, when receiving a power-limiting operation instruction or a power-releasing operation instruction;
    making primary frequency adjustment in response to a primary frequency adjustment instruction, by using the wind turbine plant itself to raise or lower the torque without changing the speed,
    wherein, for each point on the optimal rotational speed torque curve, the specific rotational speed torque curve includes a point on an isopower curve starting from said point that satisfies a predetermined condition, and wherein the predetermined condition is that a corresponding power value of said point on the isopower curve is lower than a power value corresponding to a point on the optimal rotational speed torque curve at the same rotational speed value as said point on the isopower curve by a predetermined value.

2. The power control method of claim 1, wherein the step of controlling the rotational speed and torque of the generator of the wind turbine plant based on the optimal rotational speed torque curve and the specific rotational speed torque curve when receiving the power-limiting operation instruction comprises:
    determining that the power needs to be limited to a first power value based on the received power-limiting operation instruction, when receiving the power-limiting operation instruction;
    determining a point A on the specific rotational speed torque curve corresponding to the first power value;
    using a rotational speed value and a torque value at the point A as target values to control the rotational speed and the torque.

3. The power control method of claim 2, wherein the step of using the rotational speed value and the torque value at the point A as the target values to control the rotational speed and the torque comprises:
    controlling the rotational speed and the torque to drop simultaneously to directly reach the point A, or controlling the rotational speed and the torque to drop simultaneously to the specific rotational speed torque curve and then change to the point A along the specific rotational speed torque curve, or controlling the rotational speed to drop to the rotational speed value of the point A and then controlling the torque to drop to the torque value of the point A, when the wind turbine plant is currently in a normal operating state and a current rotational speed value is greater than the rotational speed value at the point A;
    controlling the torque to drop to the isopower curve between the point A and a point B, and then controlling the rotational speed and the torque to change to the point A along the isopower curve, when the wind turbine plant is currently in the normal operating state and the current rotational speed value is less than the rotational speed value at the point A;
    controlling the torque to drop to the torque value of the point A, when the wind turbine plant is currently in the normal operating state and the current rotational speed value is equal to the rotational speed value at the point A,
    wherein the point B is a point on the optimal rotational speed torque curve with a corresponding power value equal to the first power value.

4. The power control method of claim 2, wherein the step of using the rotational speed value and the torque value at the point A as the target values to control the rotational speed and the torque comprises:
    controlling the rotational speed and the torque to change from a point C on the specific rotational speed torque curve to the point A along the specific rotational speed torque curve, when the wind turbine plant is currently in a power-limiting operating state or a power-releasing operating state and operating at the point C;
    controlling the rotational speed and the torque to drop simultaneously to the specific rotational speed torque curve and then change to the point A along the specific rotational speed torque curve, when the wind turbine plant is currently in the power-limiting operating state or power-releasing operating state and operating on the isopower curve between the point C and a point on the optimal rotational speed torque curve;
    controlling the rotational speed and the torque to drop simultaneously to directly reach the point A, or controlling the rotational speed and the torque to drop simultaneously to the specific rotational speed torque curve and then change to the point A along the specific rotational speed torque curve, or controlling the rotational speed to drop to the rotational speed value of the point A and then controlling the torque to drop to the torque value of point A, when the wind turbine plant is currently in the power-limiting operating state or power-releasing operating state and operating at a point on the optimal rotational speed torque curve with a rotational speed value greater than the rotational speed value at the point A;
    controlling the torque to drop to the isopower curve between the point A and a point B, and then controlling the rotational speed and the torque to change to the point A along the isopower curve, when the wind turbine plant is currently in the power-limiting operating state or power-releasing operating state and operating at a point on the optimal rotational speed torque curve with a rotational speed value less than the rotational speed value at the point A;

controlling the torque to drop to the torque value of the point A, when the wind turbine plant is currently in the power-limiting operating state or power-releasing operating state and operating at a point on the optimal rotational speed torque curve with a rotational speed value equal to the rotational speed value at the point A;

wherein the point B is a point on the optimal rotational speed torque curve with a corresponding power value equal to the first power value.

5. The power control method of claim 2, wherein after controlling the rotational speed and torque of the generator of the wind turbine plant based on the optimal rotational speed torque curve and the specific rotational speed torque curve when receiving the power-limiting operation instruction, the power control method further comprises:

when the wind turbine plant is operating at the point A and has not received a primary frequency adjustment instruction, as a wind speed decreases, controlling the rotational speed and the torque to change from the point A to a point B along the isopower curve and then decrease along the optimal rotational speed torque curve, and then as the wind speed increases, controlling the rotational speed and the torque to increase to the point B along the optimal rotational speed torque curve and then change to the point A along the isopower curve, wherein the point B is a point on the optimal rotational speed torque curve with a corresponding power value equal to the first power value; and/or when the wind turbine plant is operating at the point A and received a primary frequency adjustment power increasing instruction, determining that the power needs to be increased to a third power value based on the received primary frequency adjustment power increasing instruction, and controlling the rotational speed to remain unchanged and controlling the torque to increase until the power increases to the third power value; and/or when the wind turbine plant is operating at the point A and received a primary frequency adjustment power decreasing instruction, determining that the power needs to be decreased to a fourth power value based on the received primary frequency adjustment power decreasing instruction, and controlling the rotational speed to remain unchanged and controlling the torque to decrease until the power decreases to the fourth power value; and/or when the wind turbine plant is currently in a power-limiting operating state but cannot maintain operating at the point A, and the wind turbine plant received the primary frequency adjustment power decreasing instruction, determining, based on an adjustment amount in the received primary frequency adjustment power decreasing instruction and the current power, that the power needs to be decreased to a fifth power value, and controlling the rotational speed to remain unchanged and controlling the torque to decrease until the power decreases to the fifth power value.

6. The power control method of claim 5, wherein the power control method further comprises:

after controlling the rotational speed to remain unchanged and controlling the torque to increase until the power increases to the third power value, as the wind speed decreases, controlling the rotational speed to remain unchanged and controlling the torque to decrease until returning to the point A, and controlling the rotational speed and the torque to change from the point A to the point B along the isopower curve and then decrease along the optimal rotational speed torque curve, and then as the wind speed increases, controlling the rotational speed and torque to increase to the point B along the optimal rotational speed torque curve and then change to the point A along the isopower curve; and/or, after controlling the rotational speed to remain unchanged and controlling the torque to decrease until the power decreases to the fourth power value, as the wind speed decreases, controlling the rotational speed and the torque to change to the optimal rotational speed torque curve along the isopower curve and then decrease along the optimal rotational speed torque curve, and then as the wind speed increases, controlling the rotational speed and the torque to increase to the point B along the optimal rotational speed torque curve and then change to the point A along the isopower curve.

7. The power control method of claim 1, wherein the step of controlling the rotational speed and torque of the generator of the wind turbine plant based on the optimal rotational speed torque curve and the specific rotational speed torque curve when receiving the power-releasing operation instruction comprises:

determining that the power needs to be released to a second power value based on the received power-releasing operation instruction, when receiving the power-releasing operation instruction;

determining a point D on the specific rotational speed torque curve corresponding to the second power value;

using a rotational speed value and a torque value at the point D as target values to control the rotational speed and the torque.

8. The power control method of claim 7, wherein the step of using the rotational speed value and the torque value at the point D as the target values to control the rotational speed and torque comprises:

controlling the rotational speed and the torque to change to the point D, when the wind turbine plant is currently in a normal operating state and has energy reserve during the entire power releasing process;

controlling the rotational speed and the torque to stay at a point E on the specific rotational speed torque curve, and controlling a target torque value to increase from the point E to the optimal rotational speed torque curve and then controlling the target torque value and a target rotational speed value to increase to a point F along optimal rotational speed torque curve, and controlling the target torque value and the target rotational speed value from the point F to the point D along the isopower curve, when the wind turbine plant is currently in the normal operating state and has no reserve energy after controlling the rotational speed and torque to change to the point E during the power releasing;

wherein the point F is a point on the optimal rotational speed torque curve with a corresponding power value equal to the second power value.

9. The power control method of claim 7, wherein the step of using the rotational speed value and the torque value at the point D as the target values to control the rotational speed and torque comprises:

controlling the rotational speed and the torque to change to the point D along the specific rotational speed torque curve, when the wind turbine plant is currently in the power-limiting operating state or power-releasing operating state and has energy reserve during the entire power releasing process;

controlling the rotational speed and torque to stay at a point E on the specific rotational speed torque curve, and controlling a target torque value to increase from the point E to the optimal rotational speed torque curve and then controlling the target torque value and a target rotational speed value to increase to a point F along the optimal rotational speed torque curve, and controlling the target torque value and the target rotational speed value from the point F to the point D along the isopower curve, when the wind turbine plant is currently in the power-limiting operating state or power-releasing operating state and has no reserve energy after controlling the rotational speed and torque to the point E during the power releasing;

wherein the point F is a point on the optimal rotational speed torque curve with a corresponding power value equal to the second power value.

10. A power control device for a wind turbine plant, wherein the power control device comprises:
   a control unit for controlling rotational speed and torque of a generator of the wind turbine plant based on an optimal rotational speed torque curve and a specific rotational speed torque curve, when receiving a power-limiting operation instruction or a power-releasing operation instruction;
   wherein primary frequency adjustment is made in response to a primary frequency adjustment instruction, by using the wind turbine plant itself to raise or lower the torque without changing the speed;
   wherein, for each point on the optimal rotational speed torque curve, the specific rotational speed torque curve includes a point on an isopower curve starting from said point that satisfies a predetermined condition, and wherein the predetermined condition is that a corresponding power value of said point on the isopower curve is lower than the power value corresponding to a point on the optimal rotational speed torque curve at the same rotational speed value as said point on the isopower curve by a predetermined value.

11. The power control device of claim 10, wherein the control unit comprises:
   a first target power value determining unit for determining that the power needs to be limited to a first power value based on the received power-limiting operation instruction, when receiving the power-limiting operation instruction;
   a first rotational speed and torque controlling unit for determining a point A on the specific rotational speed torque curve corresponding to the first power value, and using a rotational speed value and a torque value at the point A as target values to control the rotational speed and the torque.

12. The power control device of claim 11, wherein the control unit comprises:
   a second target power value determining unit for determining that the power needs to be released to a second power value based on the received power-releasing operation instruction, when receiving the power-releasing operation instruction;
   a second rotational speed and torque controlling unit for determining a point D on the specific rotational speed torque curve corresponding to the second power value, and using a rotational speed value and a torque value at the point D as target values to control the rotational speed and the torque.

13. The power control device of claim 10, wherein the power control device is arranged in a main controller of the wind turbine plant.

14. A computer-readable storage medium storing a computer program, wherein the computer program, when executed by a processor, implements the power control method for the wind turbine plant according to claim 1.

15. A power control device for a wind turbine plant, wherein the power control device comprises:
   a processor;
   a memory storing a computer program, wherein the computer program, when executed by the processor, implements the power control method for the wind turbine plant according to claim 1.

16. A wind turbine plant, wherein the wind turbine plant is provided with the power control device according to claim 10.

* * * * *